US006970466B2

(12) United States Patent
Okubo

(10) Patent No.: US 6,970,466 B2
(45) Date of Patent: Nov. 29, 2005

(54) PACKET SWITCHING APPARATUS

(75) Inventor: Keiji Okubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 766 days.

(21) Appl. No.: 09/897,951

(22) Filed: Jul. 5, 2001

(65) Prior Publication Data
US 2004/0202178 A1 Oct. 14, 2004

(30) Foreign Application Priority Data
Jul. 11, 2000 (JP) .............................. 2000-209456

(51) Int. Cl.[7] .......................... H04L 12/28; H04L 12/56
(52) U.S. Cl. ................... 370/395; 370/238.1; 370/389; 370/412; 370/395.42
(58) Field of Search .................. 370/395, 238.1, 370/389, 60, 60.1, 359, 358, 360, 366, 391, 370/395.1, 386, 415, 417, 419, 422, 429, 370/64, 94.1, 85.2, 91, 396, 395.71, 395.72, 370/395.7, 400, 412, 413, 902, 387, 388, 370/395.42, 395.51; 340/2.28, 14.69

(56) References Cited

U.S. PATENT DOCUMENTS

| 5,124,978 | A | * | 6/1992 | Chao ........................... 370/422 |
| 5,157,654 | A | * | 10/1992 | Cisneros ....................... 370/414 |
| 5,166,926 | A | * | 11/1992 | Cisneros et al. ............. 370/392 |
| 5,179,552 | A | * | 1/1993 | Chao ........................... 370/427 |
| 5,197,064 | A | * | 3/1993 | Chao ........................... 370/398 |
| 5,274,642 | A | * | 12/1993 | Widjaja et al. .............. 370/411 |
| 5,280,483 | A | * | 1/1994 | Kamoi et al. ................ 370/234 |
| 5,285,444 | A | | 2/1994 | Sakurai et al. |
| 5,335,222 | A | * | 8/1994 | Kamoi et al. ................ 370/230 |
| 5,398,235 | A | * | 3/1995 | Tsuzuki et al. ............. 370/219 |
| 5,406,556 | A | * | 4/1995 | Widjaja et al. .............. 370/411 |
| 5,414,696 | A | * | 5/1995 | Tsuzuki et al. ............. 370/219 |
| 5,455,701 | A | * | 10/1995 | Eng et al. ...................... 398/54 |
| 5,537,403 | A | * | 7/1996 | Cloonan et al. ............. 370/352 |
| 5,544,160 | A | * | 8/1996 | Cloonan et al. ......... 370/395.1 |
| 5,550,815 | A | * | 8/1996 | Cloonan et al. ............. 370/396 |

(Continued)

FOREIGN PATENT DOCUMENTS

JP 02-284542 11/1990

(Continued)

OTHER PUBLICATIONS

M. Omotani, et al., "B-519 A Large-scale ATM Switch Architecture for Multimedia Traffic", NTT Network Service Systems Laboratiories General Assembly, 1996, Communication Society, The Institute of Electronics, Information and Communication Engineers, p. 3 (with English Translation-2 pages).

Primary Examiner—Wellington Chin
Assistant Examiner—Jamal A. Fox
(74) Attorney, Agent, or Firm—Oblon, Spivak, McClelland, Maier & Neustadt, P.C.

(57) ABSTRACT

A packet switching apparatus for simplifying and reducing the size of a packet switching circuit which is to perform at high speed. The packet switching apparatus is provided with a first packet switching unit for sorting a data packet from one of a plurality of input lines into one of a plurality of transfer lines. The packet switching apparatus is also provided with a second packet switching unit for sorting a data packet from a transfer line into one of a plurality of output lines of a respective output line group. A transfer line transfers a data packet at a line speed faster than a sum of the line speeds of the output lines included within the respective output line group.

15 Claims, 6 Drawing Sheets

U.S. PATENT DOCUMENTS

| | | | |
|---|---|---|---|
| 5,642,349 A * | 6/1997 | Cloonan et al. | 370/360 |
| 5,687,172 A * | 11/1997 | Cloonan et al. | 370/395.71 |
| 5,724,349 A * | 3/1998 | Cloonan et al. | 370/390 |
| 5,724,351 A * | 3/1998 | Chao et al. | 370/395.42 |
| 5,724,352 A * | 3/1998 | Cloonan et al. | 370/388 |
| 5,790,522 A * | 8/1998 | Fichou et al. | 370/236 |
| 5,838,681 A * | 11/1998 | Bonomi et al. | 370/395.41 |
| 6,049,534 A * | 4/2000 | Sakamoto et al. | 370/331 |
| 6,163,528 A | 12/2000 | Nagamoto | |
| 6,212,163 B1 | 4/2001 | Aida | |
| 6,504,824 B1 | 1/2003 | Tanaka et al. | |
| 6,654,342 B1 * | 11/2003 | Dittia et al. | 370/229 |
| 6,674,754 B1 * | 1/2004 | Ofek | 370/389 |
| 6,735,173 B1 * | 5/2004 | Lenoski et al. | 370/235 |
| 6,735,199 B1 * | 5/2004 | Ofek | 370/389 |
| 6,757,282 B1 * | 6/2004 | Ofek | 370/389 |
| 6,778,536 B1 * | 8/2004 | Ofek et al. | 370/395.4 |

FOREIGN PATENT DOCUMENTS

| | | | | |
|---|---|---|---|---|
| JP | 3-235449 | 10/1991 | | |
| JP | 10-13416 | 1/1998 | | |
| JP | 11-145987 | 5/1999 | | |
| JP | 11-313079 | 11/1999 | | |
| JP | 2000-31997 | 1/2000 | | |
| JP | 2001320375 A * | 11/2001 | | H01L 12/28 |

* cited by examiner

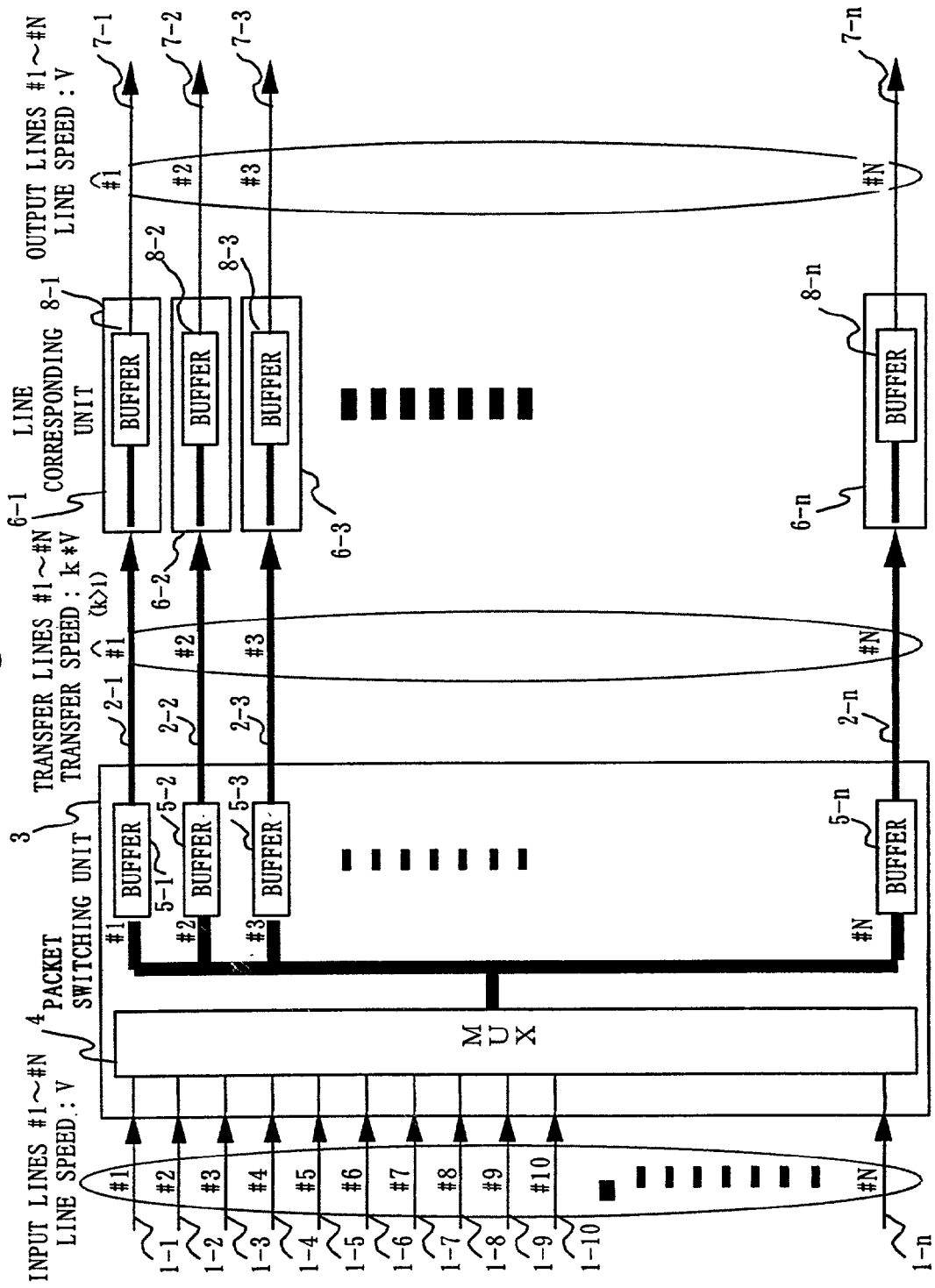
Fig. 6 CONVENTIONAL

PACKET SWITCHING APPARATUS

BACKGROUND OF THE INVENTION

1. Field of the Invention

The present invention relates to a packet switching apparatus which handles a number of input lines and a number of output lines. More particularly, the present invention relates to a packet switching technique to be used for switching a large number of packets at high speed. The present invention, for example, is applicable to ATM (Asynchronous Transfer Mode) switching which is designed for switching fixed-length packets.

2. Description of the Related Art

FIG. 6 shows a block diagram of a conventional ATM switch designed for switching fixed-length packets. (The conventional ATM switch is disclosed in a technical report entitled "B-519: A Large-scale ATM Switch Architecture for Multimedia Traffic", General Assembly 1996 of Communication Society, The Institute of Electronics, Information and Communication Engineers)

Reference numerals 1-1 to 1-n denote input lines. Reference numerals 2-1 to 2-n denote transfer lines. A reference numeral 3 denotes a packet switching unit. A reference numeral 4 denotes an MUX (multiplexer) which is included in the packet switching unit 3. Reference numerals 5-1 to 5-n denote buffers. Reference numerals 6-1 to 6-n denote line corresponding units. Reference numerals 8-1 to 8-n denote buffers.

The packet switching unit 3 is configured so as to sort data packets received through the input lines 1-1 to 1-n into the transfer lines 2-1 to 2-n. The packet switching unit 3 is provided with the buffer stores 5-1 to 5-n which correspond, respectively, to the transfer lines 2-1 to 2-n. Each of the buffer stores 5-1 to 5-n is configured so as to store the data packets.

The line corresponding units 6-1 to 6-n are provided, respectively, with the buffer stores 8-1 to 8-n. Each of the buffer stores 8-1 to 8-n is configured so as to store the data packets received through a corresponding one of the transfer lines 2-1 to 2-n and outputs the data packets through a corresponding one of the output lines 7-1 to 7-n.

The operation of the conventional ATM switch is now discussed. The packet switching unit 3 sorts data packets (ATM cells) received through the input lines 1-1 to 1-n into the line corresponding units 6-1 to 6-n corresponding respectively to the output lines 7-1 to 7-n.

Specifically, the MUX 4 multiplexes the data packets received through the input lines 1-1 to 1-n. In addition to that, the MUX 4 outputs multiplexed data to the buffer stores 5-1 to 5-n, respectively.

Each of the buffer stores 5-1 to 5-n stores data packets to be outputted to a corresponding one of the line corresponding units 6-1 to 6-n alone. Each of stored data packets is read out at a transfer speed k×V(k>1) which is faster than a line speed V used by the output lines 7-1 to 7-n. Readout data packets are transferred through the corresponding one of the transfer lines 2-1 to 2-n.

The throughput is increased more by thus reading out the data packets at the transfer speed k×V(k>1) faster than the line speed V than by reading out the data packets at the line speed V. Increased throughput thus obtained allows a reduction in the size of the individual buffer stores 5-1 to 5-n.

The line corresponding units 6-1 to 6-n store the data packets received through the corresponding ones of the transfer lines 2-1 to 2-n in their own buffer stores 8-1 to 8-n. Stored data packets are then read out at the line speed V of the respective output lines 7-1 to 7-n and outputted through the output lines 7-1 to 7-n.

As discussed earlier, the buffer stores to be used for switching data packets are thus provided in a decentralized manner in the packet switching unit 3 and the line corresponding units 6-1 to 6-n. This can reduce the size of a buffer store 5 (which is a generic term of the buffer stores 5-1 to 5-n included in the packet switching unit 3) which requires a high speed performance at a speed of (N number of output lines×line speed V).

In particular, in the case of ATM switching for switching fixed-length packets, it may be effective to minimize the size of the circuit which is to perform at high speed.

However, there is a problem of the conventional packet switching apparatus thus configured requiring the high-speed performance circuits as many as the number of output lines.

SUMMARY OF THE INVENTION

One embodiment of the present invention is directed to solving the problem by eliminating the defect of the conventional art discussed above. It is an object of the embodiment of the present invention to attain a simplified configuration of a packet switching apparatus by further reducing the size of a high speed processing circuit required for packet switching. The simplified configuration of a packet switching apparatus is designed, in particular, to be applied to a packet switching apparatus which handles a number of output lines in order to switch a large number of packets at high speed.

These and other objects of the embodiments of the present invention are accomplished by the present invention as hereinafter described in further detail.

According to one aspect of the present invention, a packet switching apparatus for sorting data packets received through a plurality of input lines into a plurality of output lines includes, (1) a plurality of transfer lines corresponding, respectively, to a plurality of output line groups allocated of the plurality of output lines, each line of the plurality of transfer lines for transmitting the data packets at a line speed which is faster than a totaled line speed of a plurality of output lines in each group of the plurality of output line groups, (2) a first packet switching unit connected to the plurality of input lines and the plurality of transfer lines, for first sorting the data packets received through the plurality of input lines into corresponding ones of the plurality of output line groups through which the data packets are to be outputted, and for outputting first sorted data packets to corresponding ones of the plurality of transfer lines corresponding to the plurality of output line groups, and (3) a plurality of second packet switching units connected, respectively, to the plurality of transfer lines and the plurality of output line groups corresponding respectively to the plurality of transfer lines, for second sorting the first sorted data packets received through the plurality of transfer lines into corresponding ones of the plurality of output lines through which the data packets are to be outputted, and for outputting second sorted data packets to the corresponding ones of the plurality of output lines.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 6 shows a block diagram of a conventional ATM switch designed for switching fixed-length packets.

DETAILED DESCRIPTION OF THE PREFERRED EMBODIMENTS

Figure 1:
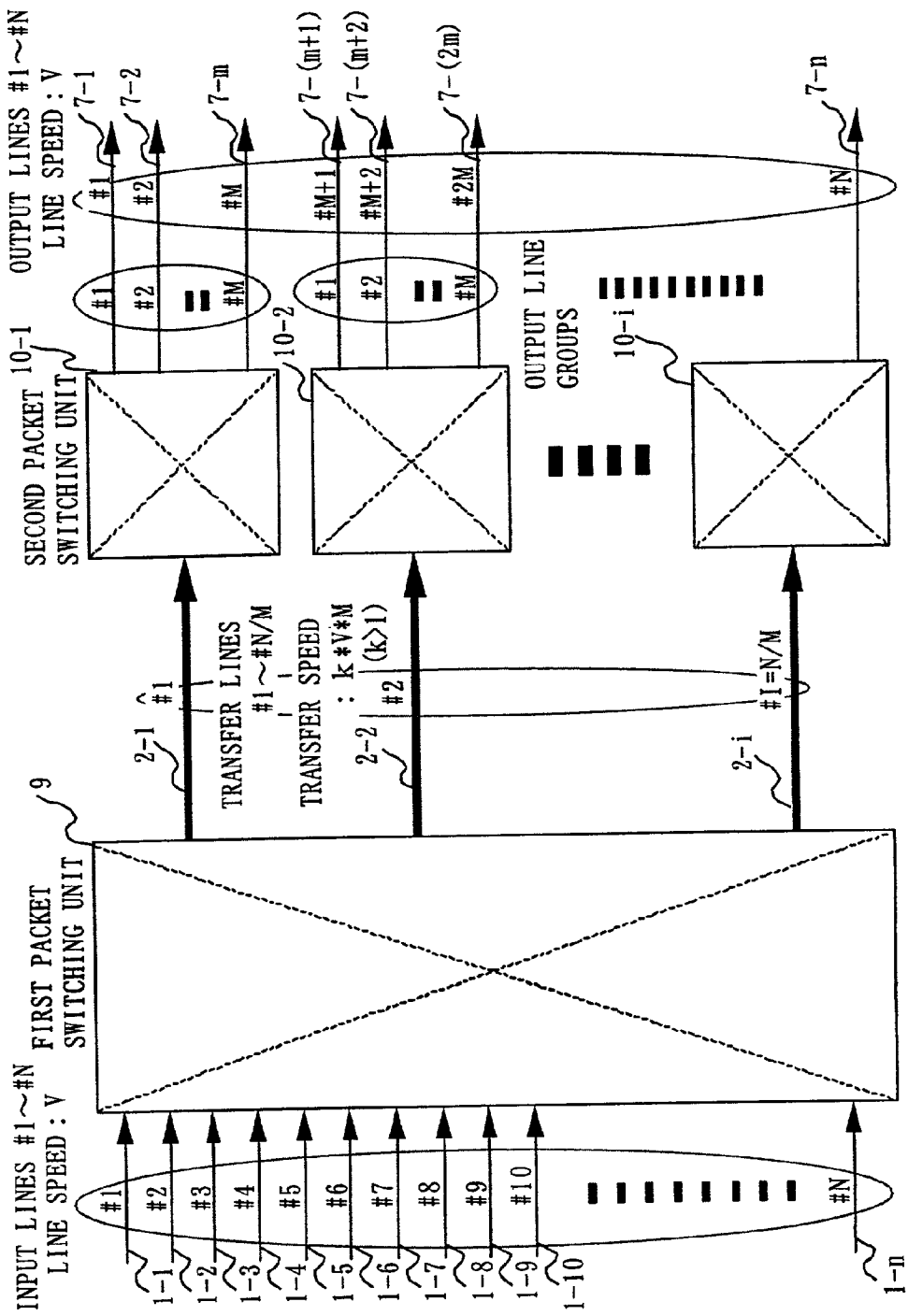
FIG. 1 shows a block diagram of a packet switching apparatus according to a first embodiment of the present invention.

Reference will now be made in detail to the present preferred embodiments of the invention, examples of which are illustrated in the accompanying drawings, wherein like reference numerals indicate like elements through out the several views.

Embodiment 1.

FIG. 1 shows a block diagram of a packet switching apparatus according to a first embodiment of the present invention.

Referring to the figure, reference numerals 1-1 to 1-n denote input lines. Reference numerals 2-1 to 2-i denote transfer lines. A reference numeral 9 denotes a first packet switching unit for performing a first packet switching. Reference numerals 7-1 to 7-n denote output lines. Reference numerals 10-1 to 10-i denote second packet switching units for performing a second packet switching.

The first packet switching unit 9 is configured so as to sort data packets received through the input lines 1-1 to 1-n according to their corresponding transfer lines 2-1 to 2-i. The transfer lines 2-1 to 2-i are intermediate output lines, each of which corresponds to a group of M number of output lines 7 such as a group of M number of output lines 7-1 to 7-m and a group of M number of output lines 7-(m+1) to 7-(2m). The second packet switching units 10-1 to 10-i are configured each to sort data packets received through a corresponding one of the transfer lines 2-1 to 2-i into an allocated M number of output lines 7 among the output lines 7-1 to 7-n.

An operation of the packet switching apparatus of this embodiment is now discussed.

The first packet switching unit 9 sorts data packets received through the N number of the input lines 1-1 to 1-n into their corresponding ones of the transfer lines 2-1 to 2-i. Sorted data packets are then transferred to the second packet switching units 10-1 to 10-i.

The second packet switching unit 10-1 re-sorts sorted data packets received from the first packet switching unit 9 into the M number of output lines 7-1 to 7-m. Similarly, the other second packet switching units 10-2 to 10-i re-sort the sorted data packets received from the first packet switching unit 9 into their corresponding M number of output lines 7.

In this manner, the data packets inputted to the packet switching apparatus through the N number of the input lines 1-1 to 1-n are sorted into the N number of the output lines 7-1 to 7-n by the first packet switching unit 9 and the second packet switching units 10-1 to 10-i.

Specifically, the data packets are transferred respectively through the transfer lines 2-1 to 2-i from the first packet switching unit 9 to the second packet switching units 10-1 to 10-i at the transfer speed of k×M×V(k>1) which is faster than a totaled line speed of the M number of the output lines each having the line speed of V.

Thus, the packet switching apparatus of this embodiment improves the throughput by transferring data packets at such a high speed through the transfer lines 2-1 to 2-i, thereby allowing the congestion of data to be reduced at the time of switching data packets. In addition to that, the M number of output lines are processed correlatively in a group, thereby allowing the size of the circuit which is to perform at high speed of the first packet switching unit 9 to be reduced.

As aforementioned, the packet switching apparatus of this embodiment is provided with the two stages of packets switching units. In the first packet switching unit, data packets to be outputted to the plurality of output lines are switched in a collective manner, and the data packets are then switched in the second packet switching unit in a respective manner to be outputted to their corresponding ones of the output lines. Furthermore, the packet switching apparatus of this embodiment increases the speed for transferring the data packets from the first packet switching unit to the second packet switching unit, thereby allowing the size of the circuit which is to perform at high speed for high speed packet switching to be reduced. With those advantageous features of the packet switching apparatus of this embodiment, it becomes easy to implement a packet switching apparatus which handles a number of input lines and a number of output lines for switching a large number of data packets at high speed.

It may be effective, for example, to employ an ATM switch of an output buffer type or an ATM switch of a common buffer type to configure the first packet switching unit and the second packet switching units so as to implement an ATM switching device for switching fixed-length packets.

Embodiment 2.

Figure 2:
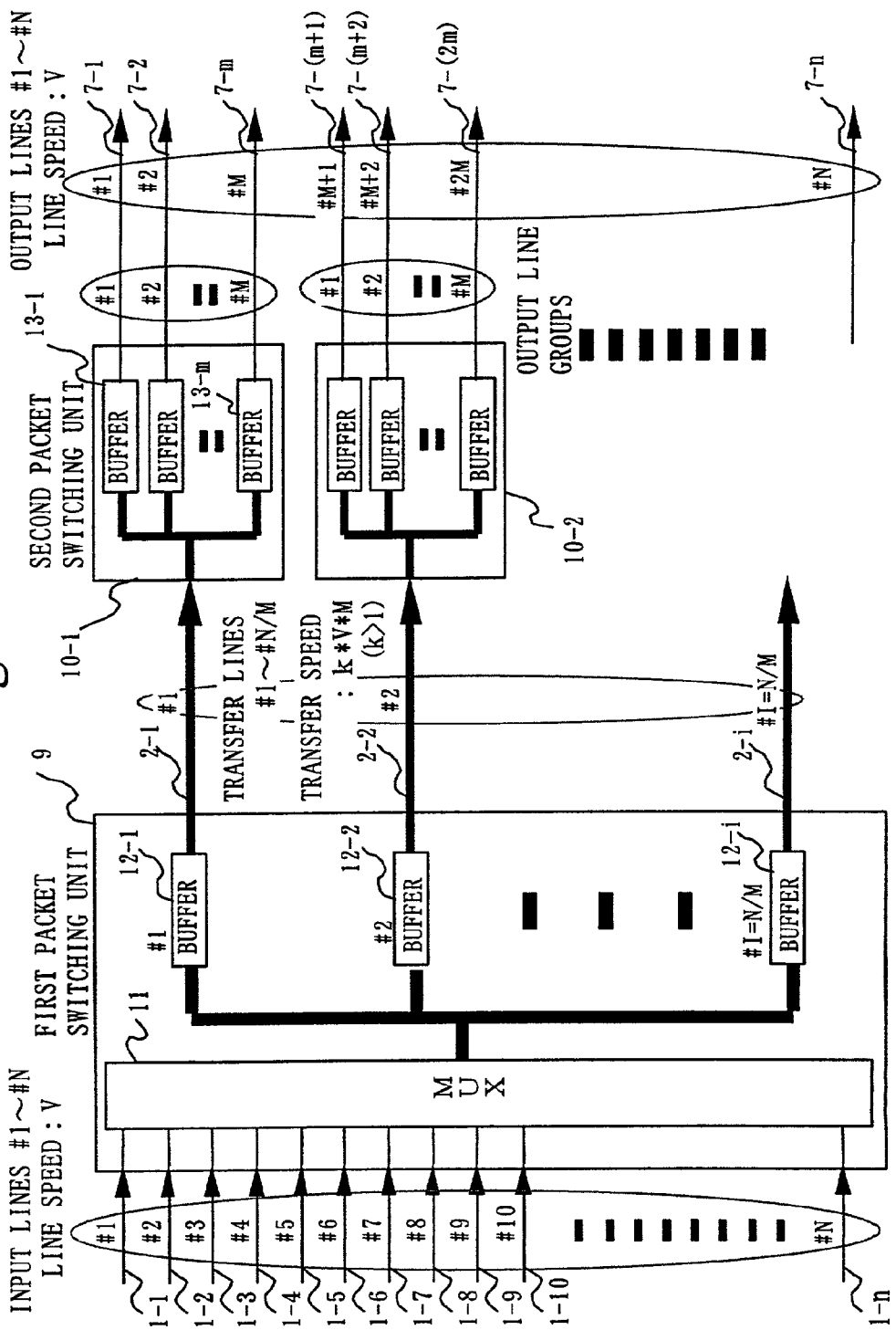
FIG. 2 shows a block diagram of a packet switching apparatus according to a second embodiment of the present invention.

FIG. 2 shows a block diagram of a packet switching apparatus according to a second embodiment of the present invention.

Referring to the figure, reference numerals 1-1 to 1-n denote input lines, reference numerals 2-1 to 2-i denote transfer lines, reference numerals 7-1 to 70-n denote output lines, a reference numeral 9 denotes a first packet switching unit, reference numerals 10-1 to 10-i denote second packet switching units, a reference numeral 11 denotes an MUX provided in the first packet switching unit 9, reference numerals 12-1 to 12-i denote buffers provided in the first packet switching unit 9, and reference numerals 13-1 to 13-m denote buffers provided, respectively, in the second packet switching units 10-1 to 10-i.

The first packet switching unit 9 is configured so as to sort received data packets through the input lines 1-1 to 1-n into the transfer lines 2-1 to 2-i. The buffers 12-1 to 12-i corresponding, respectively, to the transfer lines 2-1 to 2-i are configured so as to store the data packets.

The second packet switching units 10-1 to 10-i are configured, respectively, to sort data packets received through corresponding ones of the transfer lines 2-1 to 2-i into groups of m number of output lines 7 of the output lines 7-1 to 7-n. The buffers 13-1 to 13-m corresponding, respectively, to the output lines 7-1 to 7-n are configured so as to store the data packets.

An operation of the packet switching apparatus of this embodiment will be discussed below.

The first packet switching unit 9 performs a first sorting of data packets received through the N number of the input lines 1-1 to 1-n into the transfer lines 2-1 to 2-i. The transfer lines 2-1 to 2-i corresponding, respectively, to the groups of m number of output lines of the output lines 7-1 to 7-n. Sorted data packets are transferred to the second packet sorting units 10-1 to 10-i.

Specifically, in the first packet switching unit 9, the data packets received through the input lines 1-1 to 1-n are multiplexed by the MUX 11 and transferred to the buffers 12-1 to 12-i. Each of the buffers 12-1 to 12-i stores data packets to be outputted to a corresponding one of the second packet switching units 10-1 to 10-i alone and then outputs stored data packets at a transfer speed assigned to the individual transfer lines 2-1 to 2-i.

The second packet switching unit 10-1, for example, re-sorts the data packets sorted by the first packet switching unit 9 into a corresponding M number of output lines of the output lines 7-1 to 7-m.

Specifically, in the second packet switching unit 10-1, each of the buffers 13-1 to 13-m corresponding to the M number of output lines stores data packets to be outputted to a corresponding one of the output lines 7-1 to 7-m alone among the data packets received through the transfer line 2-1. In addition, each of the buffers 3-1 to 13-m outputs stored data packets to the corresponding one of the output lines 7-1 to 7-m at a line speed assigned to the corresponding output line.

In the same manner, each of the other second packet switching units 10-2 to 10-i sorts the data packets sorted by the first packet switching unit 9 into the M number of output lines.

Thus, the data packets inputted to the packet switching apparatus through the N number of input lines 1-1 to 1-n are processed through the first packet switching unit 9 and the second packet switching units 10-1 to 10-i to be sorted into the N number of the output lines 7-1 to 7-n.

Specifically, the transfer speed for transferring the data packets from the first packet switching unit 9 to the second packet switching units 10-1 to 10-i of the individual transfer lines 2-1 to 2-i is assumed to be k×M×V(k>1) which is a higher speed than a totaled line speed of the M number of output lines out of the output lines 7-1 to 7-n when each of the output lines is assigned V for the line speed.

Thus, the packet switching apparatus of this embodiment improves the throughput by the high-speed performance of the transfer lines 2-1 to 2-i, thereby allowing the congestion of data to be reduced at the time of switching data packets. In addition to that, the size of the buffers 12-1 to 12-i may be reduced. Furthermore, the packet switching apparatus of this embodiment handles the groups of M number of output lines in a collective manner, thereby allowing the number of the buffers provided in the first packet switching unit 9 to be reduced. In other words, there is no need of the buffers so many as the number of the output lines. It is only enough to have a corresponding number of buffers to that of the second packet switching units 10-1 to 10-i (I=N/M). This may result in reducing the size of the circuit of the first packet switching unit 9 which is to perform at high speed.

As aforementioned, the packet switching apparatus of this embodiment is provided with the two stages of packets switching units. In the first packet switching unit, data packets to be outputted to the plurality of output lines are switched in a collective manner, and the data packets are then switched in the second packet switching unit in a respective manner to be outputted to their corresponding ones of the output lines. Furthermore, the packet switching apparatus of this embodiment increases the speed for transferring the data packets from the first packet switching unit to the second packet switching unit, thereby allowing the size of the circuit which is to perform at high speed for high speed packet switching to be reduced. With those advantageous features of the packet switching apparatus of this embodiment, it becomes easy to implement a packet switching apparatus which handles a number of input lines and a number of output lines for switching a large number of data packets at high speed.

It may be effective, for example, to employ an ATM switch of an output buffer type or an ATM switch of a common buffer type to configure the first packet switching unit and the second packet switching units so as to implement an ATM switching device for switching fixed-length packets.

Embodiment 3.

Figure 3:
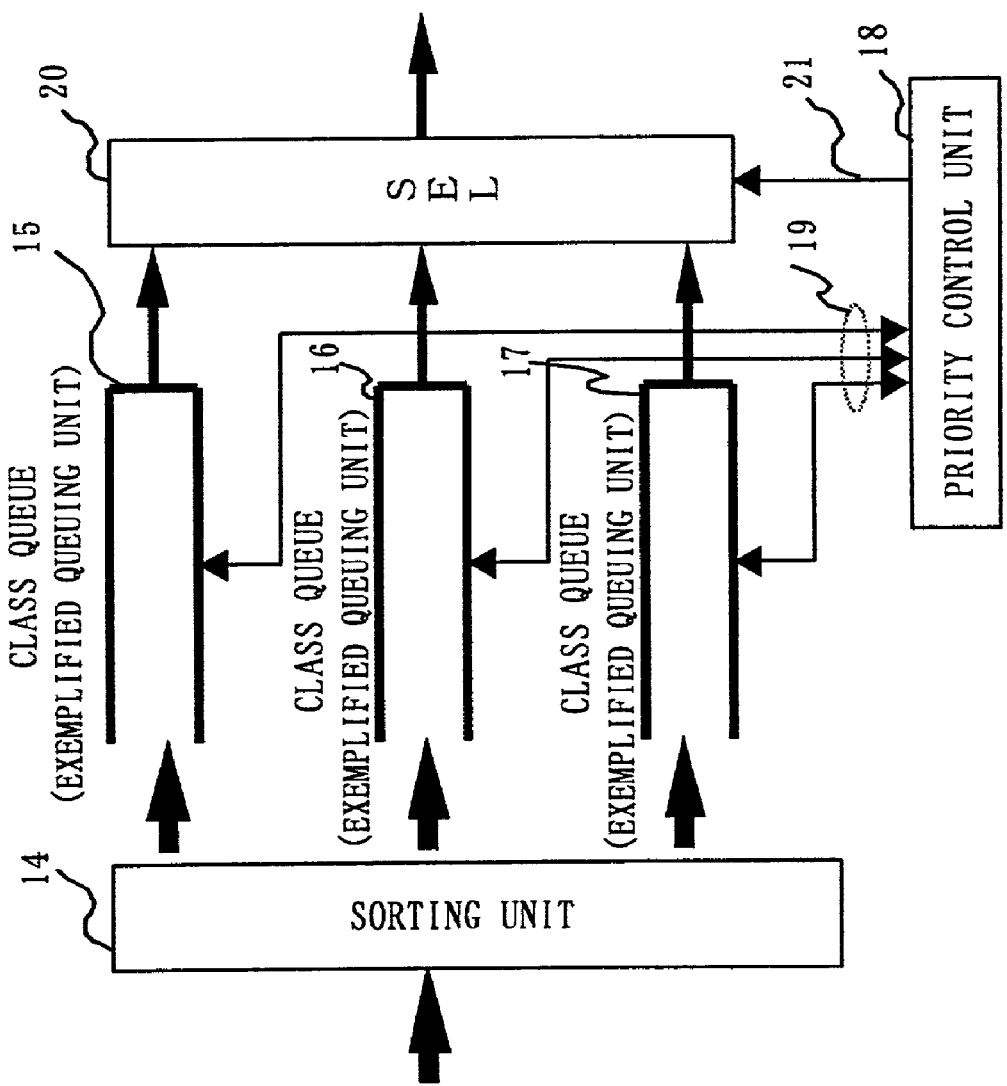
FIG. 3 shows a block diagram of buffers to be used in a packet switching apparatus according to a third embodiment of the present invention.

FIG. 3 shows a block diagram of a buffer to be implemented in a packet switching apparatus according to a third embodiment of the present invention. This configuration is applicable to the buffers 12-1 to 12-i of the first packet switching unit 9 and/or the buffers 13-1 to 13-m of the second packet switching units 10-1 to 10-i of the packet switching apparatus of the second embodiment.

Referring to FIG. 3, a reference numeral 14 denotes a sorting unit, a reference numeral 15 denotes a first priority class queue, a reference numeral 16 denotes a second priority class queue, a reference numeral 17 denotes a third priority class queue, a reference numeral 18 denotes a priority control unit, a reference numeral 19 denotes a control signal, a reference numeral 20 denotes a selecting unit, and a reference numeral 21 denotes a select signal.

The sorting unit 14 is configured so as to identify the call type (such as a service class in ATM switching) of a data packet which is inputted to the buffer and then sort the data packet.

The first priority class queue 15 is configured so as to store a sorted data packet classified in a class of first priority by the sorting unit 14. Similarly, the second priority class queue 16 is configured so as to store a sorted data packet classified in a class of second priority and the third priority class queue 17 is configured so as to store a sorted data packet classified in a class of third priority.

The priority control unit 18 is configured so as to control priority for the respective class queues. The control signal 19 indicates the storage condition of data packets in the respective class queues, a read enable status of data packet in the respective class queues, and so forth.

The selecting unit 20 is configured so as to select one of the class queues to output a data packet. The select signal 21 is used for controlling the selecting unit 20 by the priority control unit 18.

An operation of the buffer of this embodiment is now discussed.

The sorting unit 14 identifies the call type of a data packet received. In addition to that, the sorting unit 14 sorts received data packets into the first priority class queue 15, the second priority class queue 16, and the third priority class queue 17 as to priority based upon the call type of each received data packet.

The priority control unit 18 obtains the control signal 19 indicating the storage condition of data packets from the respective class queues 15 to 17, so that the priority unit 18 acknowledges the storage condition of data packets in each of the class queues 15 to 17. Then, the priority control unit 18 selects one of the class queues of the highest priority from among the class queues having a data packet stored. The data packet stored in a selected class queue are read out by the selecting unit 20 to be outputted.

Specifically, the priority control unit 18 transmits the control signal 19 indicating the read enable status of a data packet to the respective class queues according to the storage condition of data packets. In addition to that, the priority control unit 18 outputs the select signal 21 to the selecting unit 20 in synchronization with the transmission of the control signal 19.

According to this embodiment, the packet switching apparatus for switching a large number of data packets at high speed is provided with the buffer including the priority control unit, thereby allowing a large number of data packets to be switched at high speed in response to quality request indicated by the call type. Another advantageous feature of this embodiment is the simple configuration of the packet switching apparatus.

It may be effective, for example, to employ an ATM switch of an output buffer type or an ATM switch of a common buffer type to configure the first packet switching unit and the second packet switching units. It may further be effective to provide the priority control unit in either one or both of the first packet switching unit and the second packet switching units for implementing an ATM switching device for switching fixed-length packets.

Embodiment 4.

Figure 4:
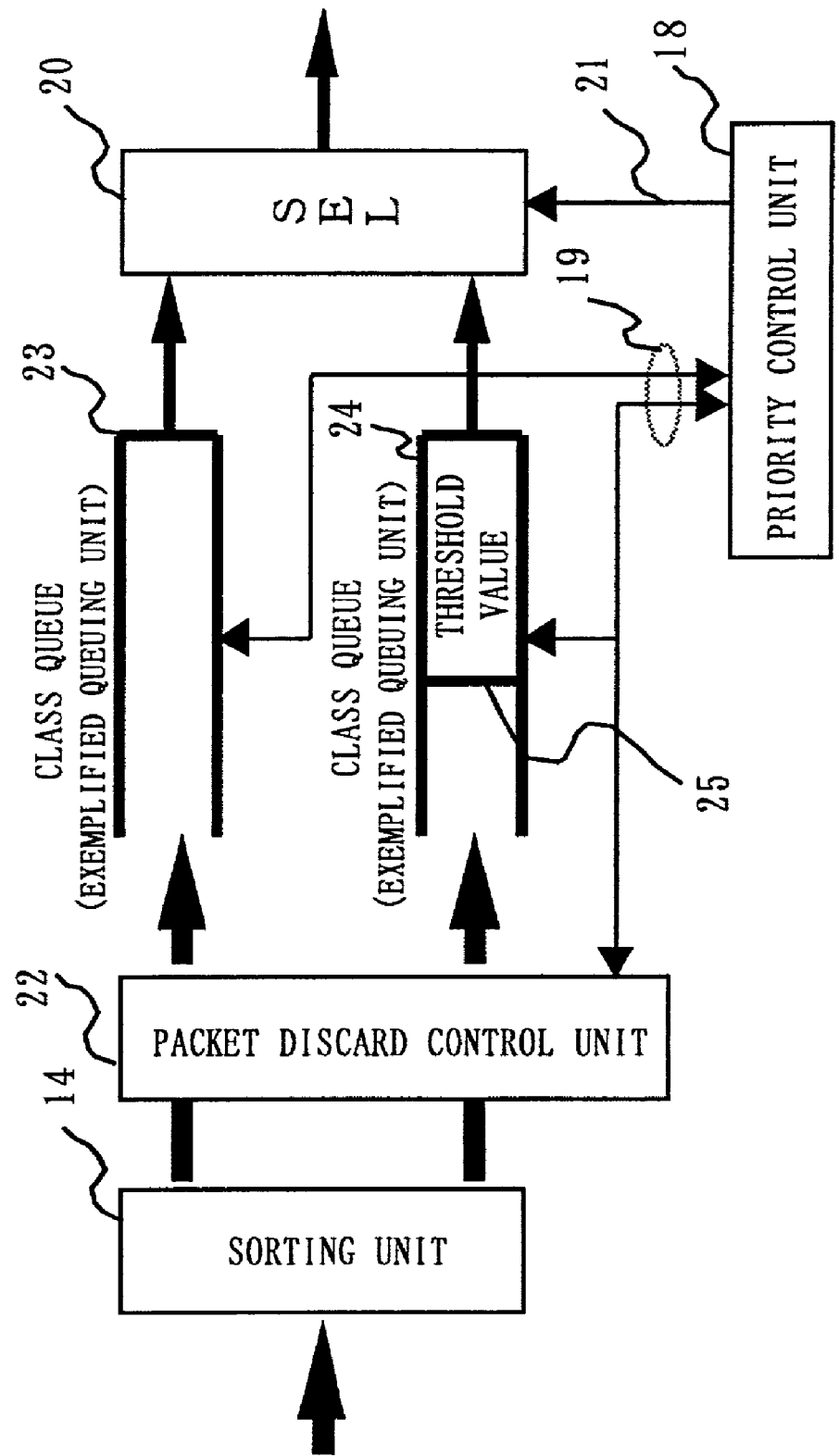
FIG. 4 shows a block diagram of buffers to be used in a packet switching apparatus according to a fourth embodiment of the present invention.

FIG. 4 shows a block diagram of a buffer to be implemented in a packet switching apparatus according to a fourth embodiment of the present invention. This configuration is applicable to the buffers 12-1 to 12-i of the first packet switching unit 9 and/or the buffers 13-1 to 13-m of the second packet switching units 10-1 to 10-i of the packet switching apparatus of the second embodiment.

Referring to FIG. 4, the reference numeral 14 denotes the sorting unit, the reference numeral 18 denotes the priority control unit, the reference numeral 19 denotes the control signal, the reference numeral 20 denotes the selecting unit, the reference numeral 21 denotes the select signal, a reference numeral 22 denotes a packet discard control unit, a reference numeral 23 denotes a high priority class queue, a reference numeral 24 denotes a low priority class queue, and a reference numeral 25 denotes a threshold value.

The sorting unit 14 is configured so as to identify the call type of a data packet received in the buffer and then sort the received data packet.

The high priority class queue 23 is configured so as to store a sorted data packet classified in a class of high priority by the sorting unit 14. The low priority class queue 24 is configured so as to store a sorted data packet classified in a class of low priority by the sorting unit 14. The low priority class queue 24 also stores the threshold value 25.

The priority control unit 18 is configured so as to control priority for the respective class queues 23, 24. The control signal 19 indicates the storage condition of data packets in the class queue 23, 24, the read enable status of a data packet stored in the respective class queues, and so forth.

The selecting unit 20 is configured so as to select one of the class queues 23 and 24 for outputting a data packet. The select signal 21 is used for controlling the selecting unit 20 by the priority control unit 18.

An operation of the buffer of this embodiment is now discussed.

The sorting unit 14 identifies the call type of a data packet received. The sorting unit 14 sorts the data packet received into the high priority class queue 23 or the low priority class queue 24 according to priority based upon the call type. Specifically, the sorted data packet is transferred to the class queue through the packet discard control unit 22. Through the aforementioned operations, data packets of high priority are stored in the high priority class queue 23 and data packets of low priority are stored in the low priority class queue 24.

The priority control unit 18 compares an amount of stored data packets of the class queue 23, 24 with the threshold value 24 and then notifies the packet discard control unit 22 of a compared result as the control signal 19. The packet discard control unit 22 discards a data packet based upon the compared result. Specifically, the data packet is selected to be discarded based upon priority obtained by the call type of the data packet and marking information (such as CLP bits in ATM switching) attached to the data packet. In the case of handling a plurality of call types in different levels of priority, for example, a call type of lower priority is prioritized to be discarded.

The priority control unit 18 receives the control signal 19 indicating the storage condition of data packets from the class queue 23, 24. Through this operation the priority control unit 18 acknowledges the storage condition of data packets of the class queue 23, 24. Then, the priority control unit 18 selects one of the class queues storing data packets which has a higher priority. A data packet stored in a selected class queue is read out by the selecting unit 20 to be outputted.

Specifically, the priority control unit 18 transmits the control signal 19 indicating the read enable status of the data packet to the class queue 23, 24 based upon the storage condition of data packets. In addition to that, the priority control unit 18 outputs the select signal 21 to the selecting unit 20 in synchronization with the transmission of the control signal.

According to this embodiment, the packet switching apparatus for switching a large number of data packets at high speed is provided with the buffer including the priority control unit and the packet discard control unit, thereby allowing a large number of data packets to be switched at high speed in response to quality request indicated by the various types of calls and the marking information. Another advantageous feature of this embodiment is the simple configuration of the packet switching apparatus.

It may be effective, for example, to employ an ATM switch of an output buffer type or an ATM switch of a common buffer type to configure the first packet switching unit and the second packet switching units. It may further be effective to provide the priority control unit and the packet discard control unit in either one or both of the first packet switching unit and the second packet switching units for implementing an ATM switching device for switching fixed-length packets.

Embodiment 5.

Figure 5:
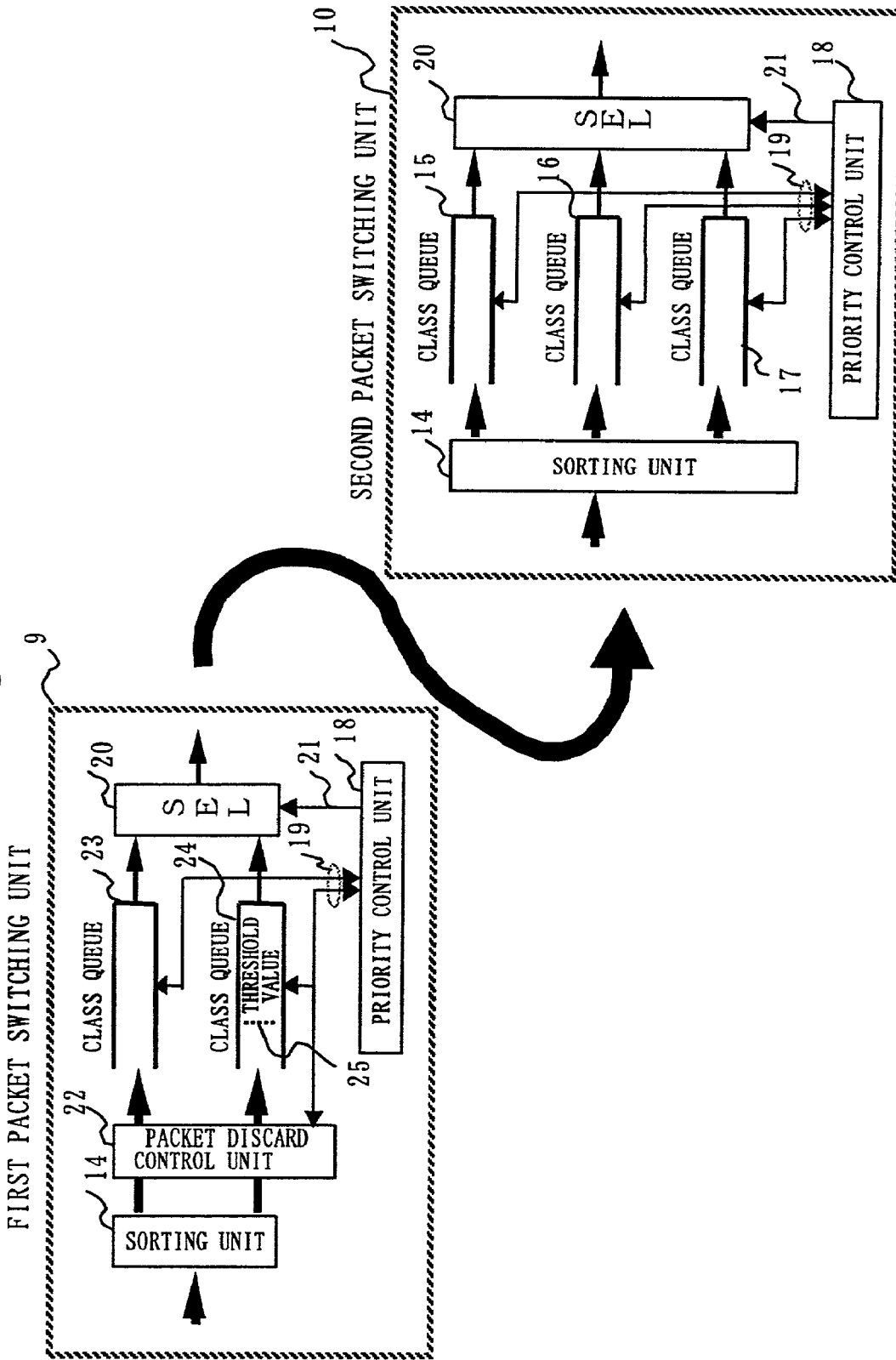
FIG. 5 shows a block diagram of buffers to be used in a packet switching apparatus according to a fifth embodiment of the present invention.

FIG. 5 shows a block diagram of buffers to be used in a packet switching apparatus according to a fifth embodiment of the present invention.

FIG. 5 illustrates an example of buffers to be used for the buffers 12-1 to 12-i of the first packet switching unit 9 and the buffers 13-1 to 13-n of the second packet switching units 10-1 to 10-i in the second embodiment.

The buffer of the first packet switching unit 9 of FIG. 5 is the same in configuration as the buffer discussed in the fourth embodiment and operates in the same manner.

The buffer of the second packet switching unit of FIG. 5 is the same in configuration as the buffer discussed in the third embodiment and which operates in the same manner.

According to this example, different call types indicating levels of priority in high or low priority, which is employed in the first packet switching unit 9, and indicating levels of priority in the first, second or third priority, which is employed in the second packet switching unit 10, are treated in the following manner. The first priority is regarded as the high priority and the second or third priority is regarded as the low priority. Furthermore, in the case that an amount of data packets stored in the class queue 23, 24 in the first packet switching unit 9 exceeds the threshold value 24, then a data packet having the call type of the third priority is prioritized to be discarded.

By handling the priority in such a manner, packet switching can be performed in response to quality request indicated by the call types identifying the three levels of priority.

According to this embodiment, the packet switching apparatus for switching a large number of data packets at high speed is provided with the first packet switching unit including the priority control unit and the packet discard control unit and the second packet switching unit including the priority control unit, thereby allowing a large number of data packets to be switched at high speed in response to quality request indicated by various call types and marking information. Another advantageous feature of this embodiment is the simple configuration of the packet switching apparatus.

According to this embodiment, it may be effective, for example, to employ an ATM switch of an output buffer type or an ATM switch of a common buffer type to configure the first packet switching unit and the second packet switching units so as to implement an ATM switching device for switching fixed-length packets.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A packet switching apparatus configured to sort data packets from input lines into output lines, the packet switching apparatus comprising:
   a plurality of transfer lines each corresponding to a respective output line group including a plurality of the output lines and each configured to transmit the data packets at a line speed which is faster than a sum of the line speeds for all of the output lines included within the respective output line group;
   a first packet switching unit connecting the input lines to the plurality of transfer lines and configured to first sort a data packet received from one of the input lines into one of the plurality of transfer lines; and
   a plurality of second packet switching units each connecting one of the plurality of transfer lines to the output lines of the respective output line group and each configured to second sort a first sorted data packet received from one of the plurality of transfer lines into one of the output lines of the respective output line group.

2. The packet switching apparatus of claim 1, wherein:
the first packet switching unit includes, on a basis of each output line group
a plurality of first queuing units corresponding to a plurality of call types, and
a first priority control unit configured to control a first read operation of the first sorted data packets from the plurality of first queuing units based upon a priority which is assigned to each call type of the plurality of call types; and
each unit of the plurality of second packet switching units includes, on a basis of each output line,
a plurality of second queuing units corresponding to the plurality of call types, and
a second priority control unit configured to control a second read operation of the second sorted data packets from the plurality of second queuing units based upon the priority which is assigned to each call type of the plurality of call types.

3. The packet switching apparatus of claim 2, wherein
at least one unit of the plurality of first queuing units stores a threshold value, and
the first packet switching unit further includes a packet discard control unit configured to compare an amount of stored data packets in each unit of the plurality of first queuing units with the threshold value when queuing, configured to select one of the first sorted data packets based upon at least one of the call types and marking information attached to the first sorted data packets, and configured to discard the first sorted packets selected prior to others if the amount of stored data packets exceeds the threshold value.

4. The packet switching apparatus of claim 2, wherein:
at least one unit of the plurality of second queuing units stores a threshold value, and
the second packet switching unit further includes a packet discard control unit configured to compare an amount of stored data packets in each unit of the plurality of second queuing units with the threshold value when queuing, configured to select one of the second sorted data packets based upon at least one of the call types and marking information attached to the second sorted data packets, and configured to discard the second sorted data packets selected prior to others if the amount of stored data packets exceeds the threshold value.

5. The packet switching apparatus of claim 2, wherein
at least one unit of the plurality of first queuing units stores a first threshold value, and
the first packet switching unit further includes a first packet discard control unit configured to compare an amount of stored data packets in each unit of the plurality of first queuing units with the first threshold value when queuing, configured to select one of the first sorted data packets based upon at least one of the call types and marking information attached to the first sorted data packets, and configured to discard the first sorted packets selected prior to others if the amount of stored data packets exceeds the first threshold value; and at least one unit of the plurality of second queuing units stores a second threshold value, and the second packet switching unit further includes a second packet discard control unit configured to compare an amount of stored data packets in each unit of the plurality of second queuing units with the second threshold value when queuing, configured to select one of the second sorted data packets based upon at least one of the call types and marking information attached to the second sorted data packets, and configured to discard the second sorted data packets selected prior to others if the amount of stored data packets exceeds the second threshold value.

6. The packet switching apparatus of claim 2, wherein the first priority control unit handles a plurality of levels of priority smaller in number than a plurality of levels of priority handled by the second priority control unit.

7. The packet switching apparatus of claim 1, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

8. The packet switching apparatus of claim 3, wherein the first priority control unit handles a plurality of levels of priority smaller in number than a plurality of levels of priority handled by the second priority control unit.

9. The packet switching apparatus of claim 4, wherein the first priority control unit handles a plurality of levels of priority smaller in number than a plurality of levels of priority handled by the second priority control unit.

10. The packet switching apparatus of claim 5, wherein the first priority of control unit handles a plurality of levels of priority smaller in number than a plurality of levels of priority handled by the second priority control unit.

11. The packet switching apparatus of claim 2, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

12. The packet switching apparatus of claim 3, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

13. The packet switching apparatus of claim 4, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

14. The packet switching apparatus of claim 5, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

15. The packet switching apparatus of claim 6, wherein the packet switching apparatus is an ATM switching device for switching an ATM cell which is a fixed-length data packet, the first packet switching unit is either one of an output buffer type ATM switch and a common buffer type ATM switch, and each of the second packet switching units is either one of an output buffer type ATM switch and a common buffer type ATM switch.

* * * * *